US010287947B2

(12) United States Patent
Kim et al.

(10) Patent No.: US 10,287,947 B2
(45) Date of Patent: May 14, 2019

(54) SELECTIVE CATALYST REDUCTION SYSTEM AND METHOD OF CONTROLLING TEMPERATURE OF REDUCING AGENT INJECTION MODULE

(71) Applicant: DOOSAN INFRACORE CO., LTD., Incheon (KR)

(72) Inventors: Jae-Seong Kim, Incheon (KR); Eun-Hyoung Kim, Incheon (KR); Nam-Il Choi, Incheon (KR); Won-Jun Choi, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 71 days.

(21) Appl. No.: 15/533,166

(22) PCT Filed: Nov. 24, 2015

(86) PCT No.: PCT/KR2015/012635
§ 371 (c)(1),
(2) Date: Jun. 5, 2017

(87) PCT Pub. No.: WO2016/089036
PCT Pub. Date: Jun. 9, 2016

(65) Prior Publication Data
US 2017/0335732 A1    Nov. 23, 2017

(30) Foreign Application Priority Data

Dec. 5, 2014 (KR) ........................ 10-2014-0174027

(51) Int. Cl.
*F01N 3/20* (2006.01)
*F01N 9/00* (2006.01)
*F01N 11/00* (2006.01)

(52) U.S. Cl.
CPC ............ *F01N 3/208* (2013.01); *F01N 9/005* (2013.01); *F01N 11/002* (2013.01);
(Continued)

(58) Field of Classification Search
CPC ........ F01N 11/002; F01N 3/208; F01N 9/005; F01N 2560/06; F01N 2610/02; F01N 2610/11; F01N 2610/1453; F01N 2610/146; F01N 2610/148; F01N 2900/08; F01N 2900/12; F01N 2900/1404; F01N 2900/1811; F01N 2900/1812; F01N 2900/1821; Y02A 50/2325; Y02T 10/24; Y02T 10/47
See application file for complete search history.

(56) References Cited

U.S. PATENT DOCUMENTS 6,354,079 B1    3/2002   Choi et al.
2009/0288395 A1  11/2009  Haeberer et al.
(Continued)

FOREIGN PATENT DOCUMENTS

DE    10 2006 053 485 A1    5/2008
DE    10 2011 009 620 A1    8/2012
(Continued)

OTHER PUBLICATIONS

European Search Report dated May 15, 2018 filed in corresponding European Patent Application No. 15866104.1.
(Continued)

*Primary Examiner* — Brandon D Lee
(74) *Attorney, Agent, or Firm* — Hauptman Ham, LLP

(57) ABSTRACT

A selective catalytic reduction system includes a reducing agent injection module installed in an exhaust pipe through which an exhaust gas is discharged from an engine and configured to inject a reducing agent into the exhaust pipe, a temperature calculator configured to calculate a temperature of the reducing agent injection module using temperature-related information of the reducing agent injection module, and a temperature controller configured to control to increase a reducing agent injection amount of the reducing agent injection module when the calculated temperature.

10 Claims, 5 Drawing Sheets

(52) U.S. Cl.
CPC ...... *F01N 2560/06* (2013.01); *F01N 2610/02* (2013.01); *F01N 2610/11* (2013.01); *F01N 2610/146* (2013.01); *F01N 2610/148* (2013.01); *F01N 2610/1453* (2013.01); *F01N 2900/08* (2013.01); *F01N 2900/12* (2013.01); *F01N 2900/1404* (2013.01); *F01N 2900/1811* (2013.01); *F01N 2900/1812* (2013.01); *F01N 2900/1821* (2013.01); *Y02T 10/24* (2013.01); *Y02T 10/47* (2013.01)

(56) References Cited

U.S. PATENT DOCUMENTS

| | | | | |
|---|---|---|---|---|
| 2010/0154385 | A1* | 6/2010 | Perrin | F01N 3/021 60/274 |
| 2013/0306156 | A1* | 11/2013 | Mueller-Haas | F01N 3/2066 137/1 |

FOREIGN PATENT DOCUMENTS

| | | |
|---|---|---|
| EP | 1 672 191 A1 | 6/2006 |
| JP | 2001193443 A | 7/2001 |
| JP | 2010090730 A | 4/2010 |
| JP | 2014114786 A | 6/2014 |
| KR | 1020120033115 A | 4/2012 |
| KR | 1020120100633 A | 9/2012 |

OTHER PUBLICATIONS

International Search Report for PCT/KR2015/012635 dated Jan. 25, 2016.

* cited by examiner

SELECTIVE CATALYST REDUCTION SYSTEM AND METHOD OF CONTROLLING TEMPERATURE OF REDUCING AGENT INJECTION MODULE

CROSS REFERENCE TO RELATED APPLICATION

This present application is a national stage filing under 35 U.S.C § 371 of PCT application number PCT/KR2015/012635 filed on Nov. 24, 2015 which is based upon and claims the benefit of priority to Korean Patent Application Nos. 10-2014-0174027 filed on Dec. 5, 2014 in the Korean Intellectual Property Office. The disclosures of the above-listed applications are hereby incorporated by reference herein in their entirety.

BACKGROUND

1. Field

Example embodiments relate to a selective catalytic reduction system and a method of controlling a temperature of a reducing agent injection module. More particularly, example embodiments relate to a method of controlling a temperature of a reducing agent injection module for performing an exhaust gas after-treatment of an internal combustion engine and an exhaust gas after-treatment system using the same.

2. Description of the Related Art

A selective catalytic reduction device may be used as an exhaust gas after-treatment device for reducing pollutants existing in an exhaust gas from an engine. The selective catalytic reduction device may include a reducing agent injection module for injecting a reducing agent in a flow direction of the exhaust gas. An engine coolant may circulate through a coolant circulation line connected to the reducing agent injection module to prevent the reducing agent injection module from being overheated due to the exhaust gas of high temperature.

However, when an injection nozzle of the reducing agent injection module is exposed frequently to the exhaust gas of high temperature in a high load work during hot season, the injection nozzle may be thermally deformed to block a nozzle hole. Due to the blockage of the nozzle hole, a proper amount of urea for NOx reduction may not be injected, thereby deteriorating NOx conversion efficiency, and in case of industrial vehicles, causing SCR inducement and an output power limit by On-Board Diagnostics (OBD), and finally an exhaust gas regulation violation and marketability deterioration.

SUMMARY

Example embodiments provide a selective catalytic reduction system capable of preventing thermal damages to a reducing agent injection module due to an exhaust gas of high temperature during engine operation and right after the engine operation.

Example embodiments provide a temperature control method for a reducing agent injection module.

According to example embodiments, a selective catalytic reduction system includes a reducing agent injection module installed in an exhaust pipe through which an exhaust gas is discharged from an engine and configured to inject a reducing agent into the exhaust pipe, a temperature calculator configured to calculate a temperature of the reducing agent injection module using temperature-related information of the reducing agent injection module, and a temperature controller configured to control to increase a reducing agent injection amount of the reducing agent injection module when the calculated temperature of the injection nozzle exceeds an allowable temperature when the engine operates.

In example embodiments, the temperature calculator may monitor in real time the temperature of the reducing agent injection nozzle through a temperature model of the reducing agent injection nozzle.

In example embodiments, the temperature-related information may include at least one of an amount of the exhaust gas, an injection amount of the reducing agent, a temperature of the exhaust gas, a fan rotation speed of a cooling fan, a coolant temperature, an atmosphere temperature and an engine room temperature.

In example embodiments, the temperature controller may be configured to limit an engine output power when the temperature of the injection nozzle exceeds an allowable temperature after the reducing agent injection amount is increased during the engine operation.

In example embodiments, the selective catalytic reduction system may further include a cooling fan installed in a side of the reducing agent injection module and configured to cool the reducing agent injection module.

In example embodiments, the temperature controller may be configured to increase a rotation speed of the cooling fan when the calculated temperature of the injection nozzle exceeds an allowable temperature right after the engine stops.

In example embodiments, a selective reduction catalyst may be installed in the exhaust pipe and the reducing agent injection module may be installed in a front side of the selective reduction catalyst.

According to example embodiments, in a method of controlling a temperature of a reducing agent injection module, temperature-related information of a reducing agent injection module installed in an exhaust pipe of an engine is detected. A temperature of an injection nozzle of the reducing agent injection module is calculated using the temperature-related information. A reducing agent injection amount of the reducing agent injection module is increased when the calculated temperature of the injection nozzle exceeds an allowable temperature when the engine operates.

In example embodiments, wherein calculating the temperature of the injection nozzle may include monitoring in real time the temperature of the reducing agent injection nozzle through a temperature model of the reducing agent injection nozzle.

In example embodiments, the temperature-related information may include at least one of an amount of the exhaust gas, an injection amount of the reducing agent, a temperature of the exhaust gas, a fan temperature, an atmosphere temperature and an engine room temperature.

In example embodiments, the method may further include limiting an engine output power when the temperature of the injection nozzle exceeds an allowable temperature after the reducing agent injection amount is increased during the engine operation.

In example embodiments, the method may further include increasing a rotation speed of a cooling fan which is installed to cool the reducing agent injection module when the calculated temperature of the injection nozzle exceeds an allowable temperature right after the engine stops.

According to example embodiments, during engine operation and right after the engine operation, a temperature of an injection nozzle may be controlled according to conditions of an exhaust gas of high temperature and an engine room of high temperature during engine operation and right after the engine operation, to thereby prevent damage to the nozzle. The temperature of a urea injection nozzle may be monitored periodically through a urea injection nozzle temperature model, and accordingly, in case of the engine operation, when the temperature of the nozzle exceeds an allowable temperature a urea injection amount may be increased such that the temperature of the nozzle may be decreased under the allowable temperature. Nonetheless, if the temperature of the nozzle is still over the allowable temperature, a second mode in which torque reduction (torque limit) is performed to prevent breakdown of the urea injection nozzle and a third mode in which an extra cooling fan is operated to decrease the nozzle temperature when in case that the engine stops the temperature of the nozzle exceeds the allowable temperature, may be selectively performed to control the temperature of the nozzle.

BRIEF DESCRIPTION OF THE DRAWINGS

Example embodiments will be more clearly understood from the following detailed description taken in conjunction with the accompanying drawings.

DETAILED DESCRIPTION OF EXAMPLE EMBODIMENTS

Figure 1:
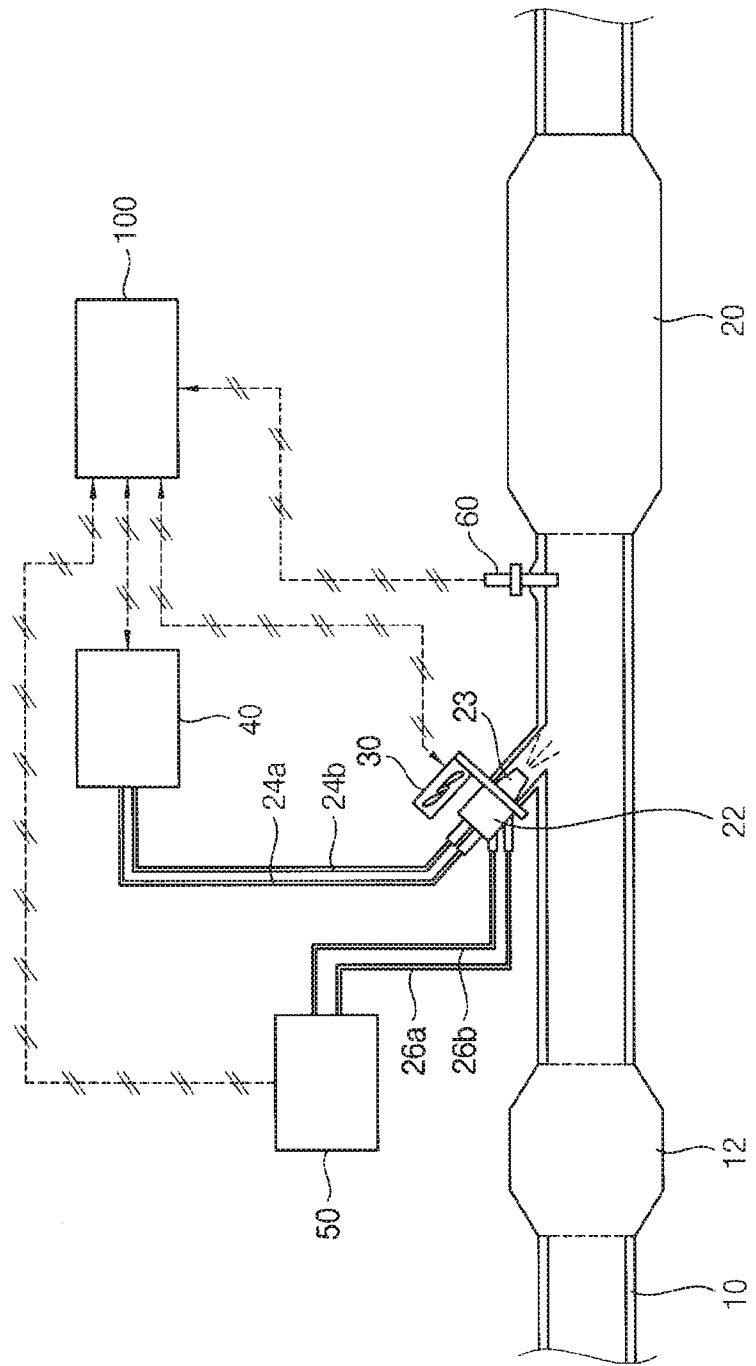
FIG. 1 is a block diagram illustrating a selective catalytic reduction system in accordance with example embodiments.

Various example embodiments will be described more fully hereinafter with reference to the accompanying drawings, in which example embodiments are shown. Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art. In the drawings, the sizes and relative sizes of components or elements may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element or layer is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
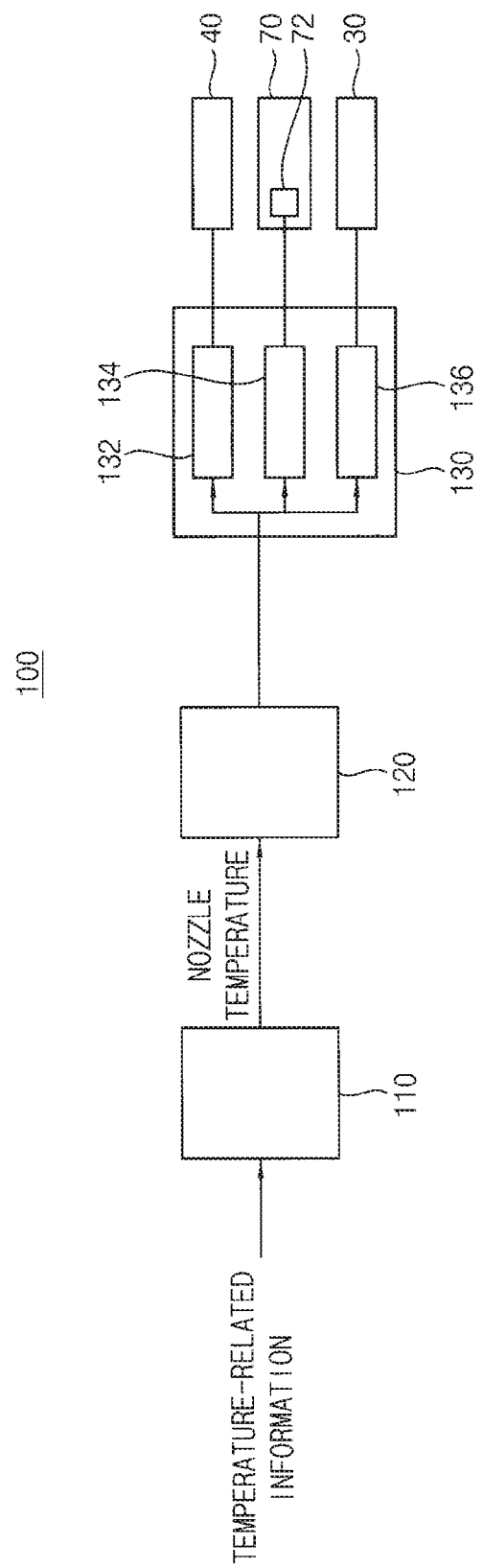
FIG. 2 is a block diagram illustrating a temperature control device of the selective catalytic reduction system in FIG. 1.
Figure 3:
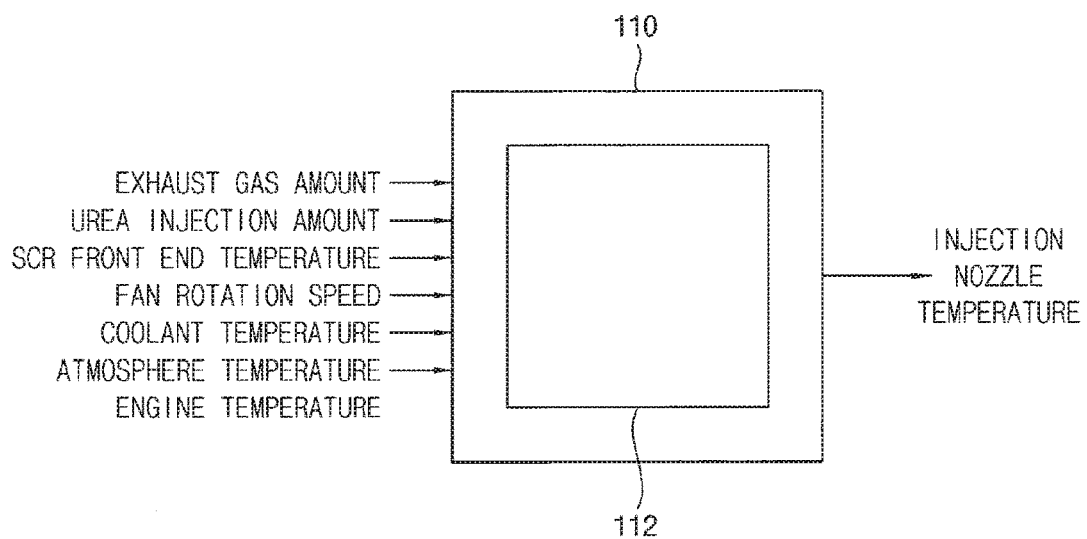
FIG. 3 is a block diagram illustrating a temperature calculator in FIG. 2.
Figure 4A:
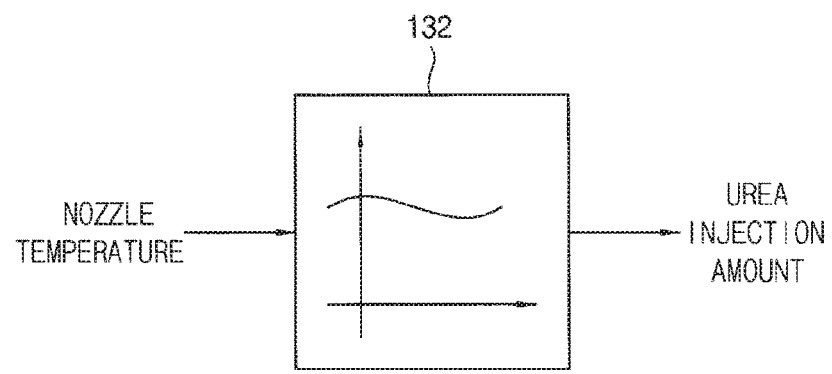
FIG. 4A is a block diagram illustrating a reducing agent injection amount calculator of a calculator in FIG. 2.
Figure 4B:
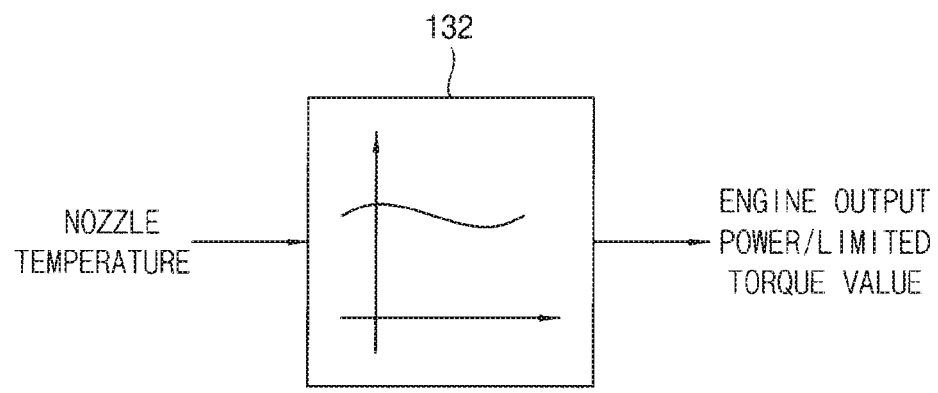
FIG. 4B is a block diagram illustrating an output power limit calculator of the calculator in FIG. 2.
Figure 4C:
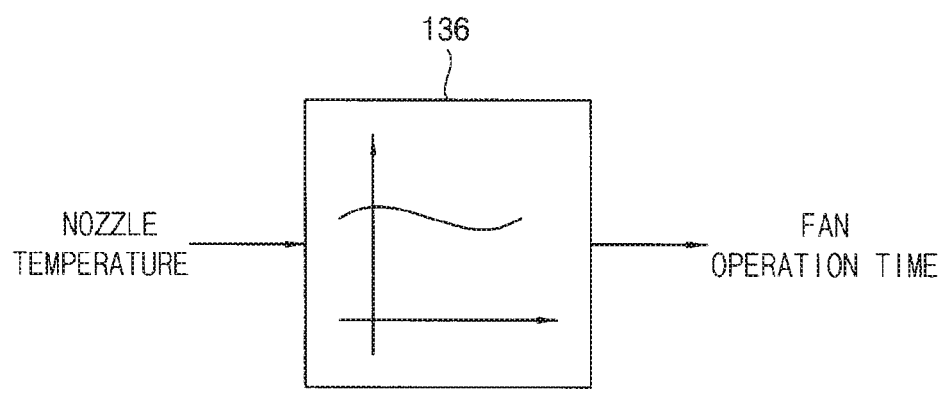
FIG. 4C is a block diagram illustrating a fan rotation speed calculator of the calculator in FIG. 2.

FIG. 1 is a block diagram illustrating a selective catalytic reduction system in accordance with example embodiments. FIG. 2 is a block diagram illustrating a temperature control device of the selective catalytic reduction system in FIG. 1. FIG. 3 is a block diagram illustrating a temperature calculator in FIG. 2. FIG. 4A is a block diagram illustrating a reducing agent injection amount calculator of a calculator in FIG. 2. FIG. 4B is a block diagram illustrating an output power limit calculator of the calculator in FIG. 2. FIG. 4C is a block diagram illustrating a fan rotation speed calculator of the calculator in FIG. 2.

Referring to FIGS. 1 to 4C, an exhaust gas after-treatment system may include a selective catalyst reduction (SCR) device 20 having a reducing agent injection module 22 for injecting a reducing agent into an exhaust gas in order to reduce NOx emissions from an engine 10, a cooling fan 30 installed adjacent to the reducing agent injection module 22 and configured to cool the reducing agent injection module 22, and a temperature control device 100 configured to control a temperature of the reducing agent injection module 22 using temperature-related information of the reducing agent injection module 22.

In example embodiments, the SCR device 20 may include a selective reduction catalyst (not illustrated) installed in an exhaust pipe 10 and the reducing agent injection module 22 for injecting the reducing agent into the exhaust pipe 10 in a front side of the selective reduction catalyst. Additionally, the exhaust gas after-treatment system may further include a diesel oxidation catalyst (DOC) device 12 installed in the exhaust pipe 10 in front of the SCR device 20.

For example, the exhaust gas may be discharged from the engine through the exhaust pipe 10 which is connected to an exhaust manifold of an internal combustion engine (not illustrated) such as a diesel engine. The diesel oxidation catalyst (DOC) device 12 may oxidize carbon monoxide and hydrocarbon included in the exhaust gas of the diesel engine. The SCR device 20 may be installed in the exhaust pipe 10 downstream of the DOC device 12 to reduce NOx.

The reducing agent injection module 22 may spray out a reducing agent such as urea to reduce nitrogen oxide (NOx) in the exhaust gas exhausted from the engine. For example, the reducing agent injection module 22 may be connected to a urea supply module 40 through supply and recovery pipes 24a and 24b to inject the urea into the exhaust pipe 10. Because the temperature of the exhaust gas from the engine ranges as high as several hundreds of degrees (° C.), the reducing agent may be injected into the exhaust pipe 10 and then be vaporized immediately. The vaporized reducing agent may be mixed with the exhaust gas, and the nitrogen oxide may react with the reducing agent adsorbed on the selective reduction catalyst such that the nitrogen oxide is reduced into a nitrogen gas and water.

The reducing agent injection module 22 may be connected to a coolant supply module 50 through a coolant supply line 26a and a coolant recovery line 26b. For example, a coolant pump (not illustrated) of the coolant supply module 50 may circulate a coolant through the coolant supply line 26a and the coolant recovery line 26b to prevent the reducing agent injection module 60 from being overheated by the exhaust gas of high temperature. The coolant pump may be connected to the engine. As the engine operates, the coolant pump may operate to circulate the coolant through the reducing agent injection module 22. As the engine stops, the coolant pump may stop such that the circulation of the coolant through the reducing agent injection module 22 is stopped.

In example embodiments, the cooling fan 30 may be installed in a side of the reducing agent injection module 22 to cool an injection nozzle 23 of the reducing agent injection module 22. The cooling fan 30 may be installed in the exhaust pipe 10 in which the reducing agent injection module 22 is installed. Alternatively, an extra fan such as a ventilation fan serving as a radiator may be used as the cooling fan 30.

As illustrated in FIGS. 1 and 2, the temperature control device 100 may include a temperature calculator 110 configured to calculate a temperature of the injection nozzle 23 from temperature-related information of the reducing agent injection module 22, and a temperature controller configured to control the temperature of the reducing agent injection module when the calculated temperature of the injection nozzle exceeds an allowable temperature based on whether the engine operates or not. The temperature controller may include a temperature control determiner 120 configured to determine whether or not the calculated temperature of the injection nozzle exceeds the allowable temperature and to determine a temperature control mode of the reducing agent injection module 22, and a calculator 130 configured to calculate at least one of an injection amount of the reducing injection module 22, a limited value of an output power of the engine and a rotation speed of the cooling fan 30 according to the determined temperature control mode.

As illustrated in FIG. 3, the temperature calculator 110 may be connected to various measuring apparatuses and sensors to receive and store measurement values which are used to calculate the temperature of the reducing agent injection nozzle 23. For example, the temperature calculator 110 may receive signals related to an amount of the exhaust gas flowing through the exhaust pipe 10 from a flow sensor, an injection amount of the reducing agent supplied from the reducing agent supply module 40, a temperature of the exhaust gas from an exhaust gas temperature sensor 60, a fan rotation speed of the cooling fan 30, a coolant temperature from a thermostat, an atmosphere temperature, an engine room temperature, etc. Alternatively, the temperature calculator 110 may be connected to an engine control unit (ECU) 70 to receive requisite measurement values.

The temperature calculator 110 may monitor in real time the temperature of the reducing agent injection nozzle 23 through a temperature model 112 of the reducing agent injection nozzle. The temperature calculator 110 may construct and store the temperature model 112 of the reducing agent injection nozzle on the basis of thermodynamics of the reducing agent injection nozzle, intake and exhaust dynamics of the engine, etc. The model may be used to calculate the temperature of the injection nozzle 23 of the reducing agent injection module 22 from the measurement values obtained by the sensors in the engine and the exhaust gas after-treatment system. Accordingly, the temperature calculator 110 may derive a current temperature of the injection nozzle 23 based on the measurement values using the temperature model.

In example embodiments, the temperature control determiner 120 may determine whether or not the calculated temperature of the injection nozzle exceeds an allowable temperature based on whether the engine operates or not, and determine the temperature control mode of the reducing agent injection module 22.

In particular, when the engine operates, the coolant pump may operate to circulate the coolant through the reducing agent injection module 22 to cool the reducing agent injection module 22. Here, in case that a driving environment is in a high load work during hot season, when the calculated temperature of the injection nozzle exceeds an allowable temperature, the temperature control determiner 120 may select a reducing agent amount control mode. In case that the high load work continues for a predetermined period, when the calculated temperature of the injection nozzle exceeds the allowable temperature, the temperature control determiner 120 may select an engine output power limit mode.

On the other hand, when the engine stops, the coolant pump may stop such that the circulation of the coolant through the reducing agent injection module 22 is stopped. Here, in case that the engine stops right after the high load work, when the calculated temperature of the injection nozzle exceeds an allowable temperature, the temperature control determiner 120 may select a coolant fan operation mode.

As illustrated in FIG. 4A, a reducing agent injection amount calculator 132 may calculate a reducing agent injection amount based on the calculated temperature of the injection nozzle when the reducing agent amount control mode is selected. When the reducing agent injection amount is determined by the reducing agent injection amount calculator 132, an injection amount control signal may be outputted to the reducing agent supply module 40 to increase the reducing agent injection amount such that the temperature of the injection nozzle 23 may be decreased to the allowable temperature or less.

As illustrated in FIG. 4B, an engine output power limit calculator 134 may calculate a limited value of the engine output power based on the calculated temperature of the injection nozzle when the engine output power limit mode is selected. The limited value of the engine output power may be an engine output power, for example, an output value for limiting an engine torque, an engine RPM, etc. When the limited torque value of the engine is determined by the engine output power limit calculator 134, an output power control signal may be outputted to an engine controller 72 of the engine control unit 70 to decrease the engine RPM to limit the engine output power.

As illustrated in FIG. 4C, a fan rotation speed calculator 136 may calculate a rotation speed of the coolant fan 30 based on the calculated temperature of the injection nozzle when the coolant fan operation mode is selected. When the rotation speed of the coolant fan 30 is determined by the fan rotation speed calculator 136, a rotation speed control signal may be outputted to the coolant fan 30 to increase the rotation speed of the coolant fan, thereby decreasing the temperature of the injection nozzle 23.

The temperature control device 100 may receive the measurement values as the temperature-related information via CAN protocol and output the control signals calculated by the calculator 130 to respective modules. Additionally, the temperature control device 100 may be provided as an extra controller or applied as a control logic equipped in the engine control unit ECU.

As mentioned above, according to the temperature control device of the reducing agent injection module, the temperature of the injection nozzle may be controlled according to conditions of the exhaust gas of high temperature and the engine room of high temperature during operation and right after operation, to thereby prevent damage to the nozzle. The temperature of the urea injection nozzle may be monitored periodically through the urea injection nozzle temperature model, and accordingly, in case of the engine operation, when the temperature of the nozzle exceeds an allowable temperature the urea injection amount may be increased such that the temperature of the nozzle may be decreased under the allowable temperature. Nonetheless, if the temperature of the nozzle is still over the allowable temperature, a second mode in which torque reduction (torque limit) is performed to prevent breakdown of the urea injection nozzle and a third mode in which an extra cooling fan is operated to decrease the nozzle temperature when in case that the engine stops the temperature of the nozzle exceeds the allowable temperature, may be selectively performed to control the temperature of the nozzle.

Hereinafter, a method of controlling a temperature of an injection module using the temperature control device of the reducing agent injection module in FIG. 1 will be explained.

Figure 5:
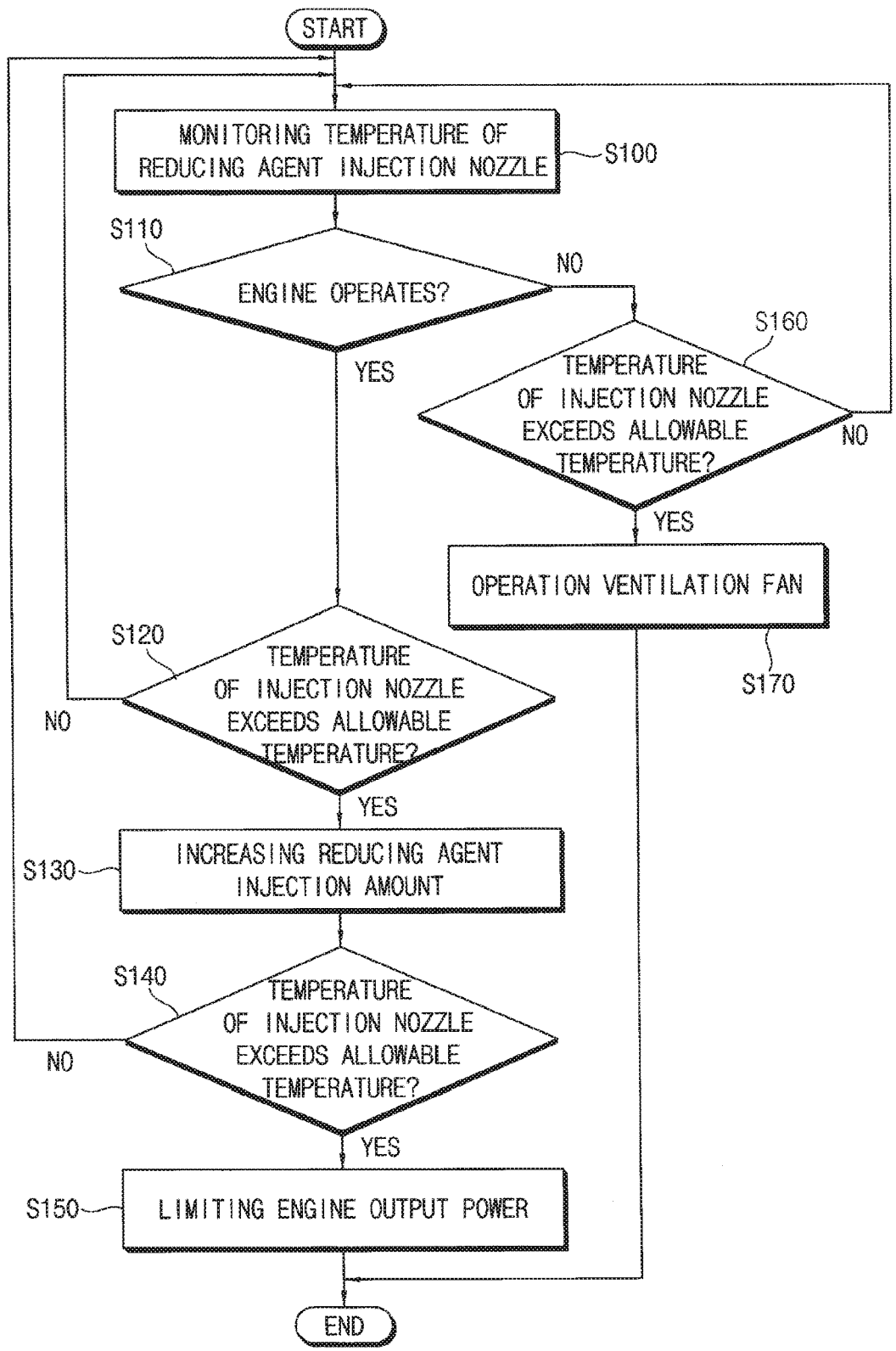
FIG. 5 is a flow chart illustrating a method of control a temperature of a reducing agent injection module in accordance with example embodiments.

FIG. 5 is a flow chart illustrating a method of control a temperature of a reducing agent injection module in accordance with example embodiments.

Referring to FIGS. 1, 2 and 5, temperature-related information of a reducing agent injection module may be received, and a temperature of a reducing agent injection nozzle may be monitored in real time through a temperature model of the reducing agent injection nozzle (S100).

In example embodiments, measurement values which are used to calculate the temperature of the reducing agent injection nozzle 23 may be received from various measuring apparatuses and sensors, and the temperature of the reducing agent injection nozzle 23 may be monitored in real time through the temperature model of the reducing agent injection nozzle.

For example, signals related to an amount of the exhaust gas flowing through the exhaust pipe 10, an injection amount of the reducing agent supplied from the reducing agent supply module 40, a temperature of the exhaust gas from an exhaust gas temperature sensor 60, a fan rotation speed of the cooling fan 30, a coolant temperature from a thermostat, an atmosphere temperature, an engine room temperature, etc. Accordingly, a current temperature of the injection nozzle 23 may be derived based on the measurement values using the temperature model.

Then, whether or not the calculated temperature of the injection nozzle exceeds an allowable temperature may be determined based on whether the engine operates or not, to determine a temperature control mode of the reducing agent injection module.

In example embodiments, in case that a driving environment is in a high load work during hot season, when the calculated temperature of the injection nozzle exceeds an allowable temperature, a reducing agent amount control mode may be selected (S110). In case that the high load work continues for a predetermined period, when the calculated temperature of the injection nozzle exceeds the allowable temperature, an engine output power limit mode may be selected (S120). On the other hand, in case that an engine stops right after the high load work, when the calculated temperature of the injection nozzle exceeds an allowable temperature, a coolant fan operation mode may be selected (S160).

Then, at least one of a reducing agent injection amount, a limited value of an engine output power and a rotation speed of a cooling fan for cooling the reducing agent injection module may be calculated according to the selected temperature control mode.

In example embodiments, when the reducing agent amount control mode is selected, the reducing agent injection amount may be calculated based on the calculated temperature of the injection nozzle (S130). An injection amount control signal may be generated according to the calculated reducing agent injection amount and inputted to the reducing agent supply module 40 to increase the reducing agent injection amount such that the temperature of the injection nozzle 23 may be decreased to the allowable temperature or less.

When the engine output power limit mode is selected, a limited value of the engine output power may be calculated based on the calculated temperature of the injection nozzle (S150). For example, the limited value of the engine output power may be an engine output power, for example, an output value for limiting an engine torque, an engine RPM, etc. An output power control signal may be generated according to the calculated limited value of the engine output power and inputted to an engine controller 72 of the engine control unit 70 to decrease the engine RPM to limit the engine output power.

When the coolant fan operation mode is selected, a rotation speed of the coolant fan 30 may be calculated based on the calculated temperature of the injection nozzle (S170). A rotation speed control signal may be generated according to the calculated rotation speed of the coolant fan may be generated and inputted to the coolant fan 30 to increase the rotation speed of the coolant fan, thereby decreasing the temperature of the injection nozzle 23.

As mentioned above, according to the temperature control method of the reducing agent injection module, a logic which controls a temperature of a nozzle tip according to conditions of the exhaust gas of high temperature and the engine room of high temperature may be provided during the engine operation and right after the engine operation, to thereby prevent damage to the nozzle.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A selective catalytic reduction system, comprising:
a reducing agent injection module installed in an exhaust pipe through which an exhaust gas is discharged from an engine, and including an injection nozzle configured to inject a reducing agent into the exhaust pipe;
a temperature calculator, implemented by a processor including electrical circuits, configured to calculate a temperature of the reducing agent injection module using information on the temperature of the reducing agent injection module; and
a temperature controller, implemented by a processor including electrical circuits, configured to control to increase a reducing agent injection amount of the reducing agent injection module when the calculated temperature of the injection nozzle exceeds an allowable temperature when the engine operates,
wherein the temperature controller is configured to decrease an engine RPM when the temperature of the injection nozzle exceeds an allowable temperature after the reducing agent injection amount is increased during the engine operation.

2. The selective catalytic reduction system of claim 1, wherein the temperature calculator monitors the temperature of the reducing agent injection nozzle through a temperature model of the reducing agent injection nozzle.

3. The selective catalytic reduction system of claim 1, wherein the temperature-related information includes at least one of an amount of the exhaust gas, an injection amount of the reducing agent, a temperature of the exhaust gas, a fan rotation speed of a cooling fan, a coolant temperature, an atmosphere temperature and an engine room temperature.

4. The selective catalytic reduction system of claim 1, further comprising
a cooling fan installed in a side of the reducing agent injection module and configured to cool the reducing agent injection module.

5. The selective catalytic reduction system of claim 4, wherein the temperature controller is configured to increase a rotation speed of the cooling fan when the calculated temperature of the injection nozzle exceeds an allowable temperature right after the engine stops.

6. The selective catalytic reduction system of claim 1, wherein a selective reduction catalyst is installed in the exhaust pipe and the reducing agent injection module is installed in a front side of the selective reduction catalyst.

7. A method of controlling a temperature of a reducing agent injection module, comprising:
detecting information on a temperature of a reducing agent injection module installed in an exhaust pipe of an engine;
calculating a temperature of an injection nozzle of the reducing agent injection module using the temperature-related information; and
increasing a reducing agent injection amount of the reducing agent injection module when the calculated temperature of the injection nozzle exceeds an allowable temperature when the engine operates; and
decreasing an engine RPM when the temperature of the injection nozzle exceeds an allowable temperature after the reducing agent injection amount is increased during the engine operation.

8. The method of claim 7, wherein calculating the temperature of the injection nozzle comprises
monitoring the temperature of the reducing agent injection module through a temperature model of the reducing agent injection module.

9. The method of claim 7, wherein the temperature-related information includes at least one of an amount of the exhaust gas, an injection amount of the reducing agent, a temperature of the exhaust gas, a fan temperature, an atmosphere temperature and an engine room temperature.

10. The method of claim 7, further comprising increasing a rotation speed of a cooling fan which is installed to cool the reducing agent injection module when the calculated temperature of the injection nozzle exceeds an allowable temperature right after the engine stops.

\* \* \* \* \*